No. 658,763. Patented Oct. 2, 1900.
J. C. DEVLIN.
PROPELLING DEVICE FOR BICYCLES.
(Application filed Nov. 4, 1899.)
(No Model.)
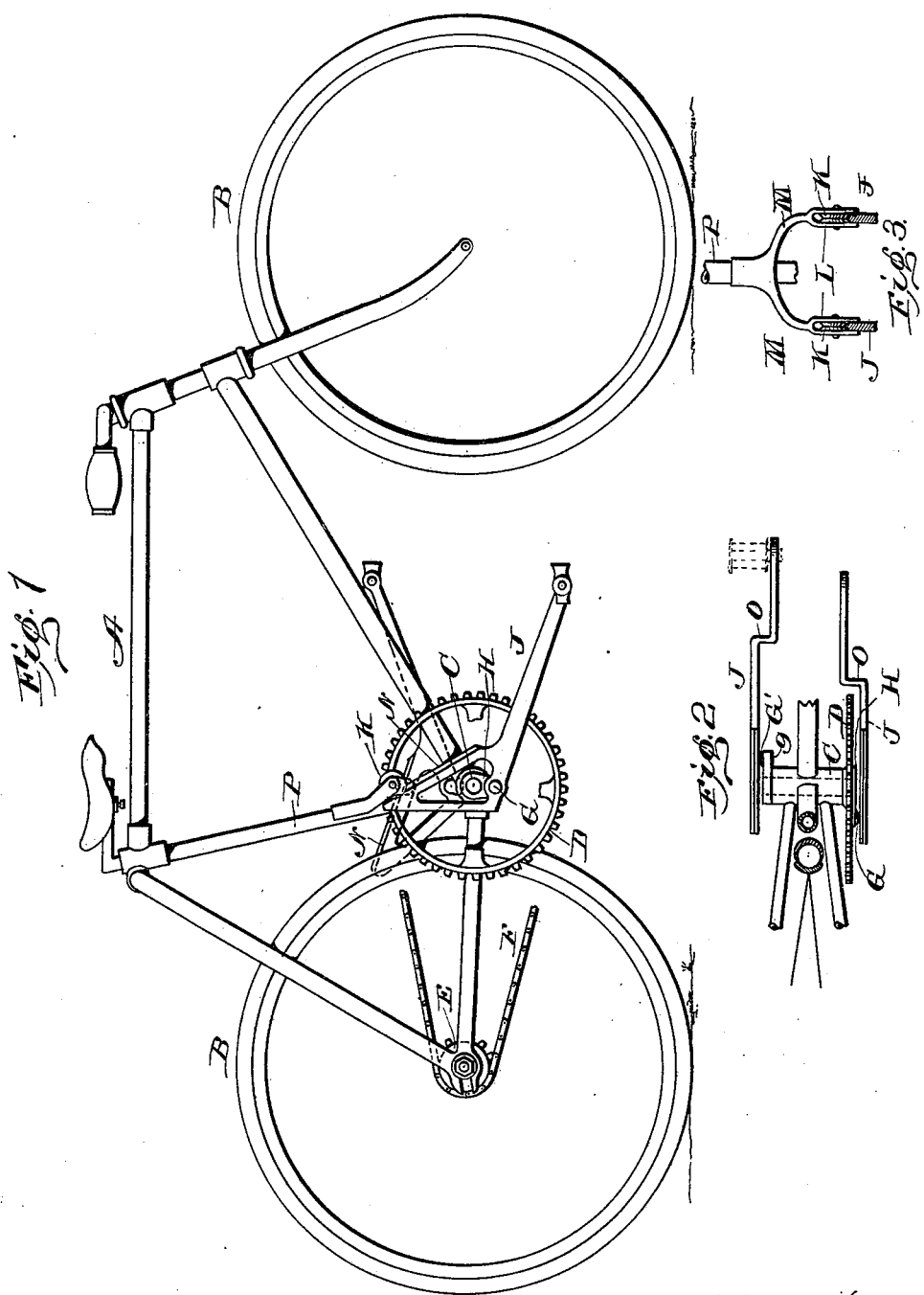

UNITED STATES PATENT OFFICE.

JAMES C. DEVLIN, OF MEMPHIS, TENNESSEE, ASSIGNOR OF ONE-HALF TO RODOLPHE DES JARDINS, OF SAME PLACE.

PROPELLING DEVICE FOR BICYCLES.

SPECIFICATION forming part of Letters Patent No. 658,763, dated October 2, 1900.

Application filed November 4, 1899. Serial No. 735,791. (No model.)

*To all whom it may concern:*

Be it known that I, JAMES C. DEVLIN, a citizen of the United States, residing at Memphis, in the county of Shelby, State of Tennessee, have invented certain new and useful Improvements in Propelling Devices for Bicycles; and I do hereby declare the following to be a full, clear, and exact description of the invention, such as will enable others skilled in the art to which it appertains to make and use the same.

This invention relates to means for propelling either chain or chainless bicycles, and particularly to devices for replacing the ordinary cranks by which the driving-shaft is rotated. With such cranks power is applied while the pedal is passing through perhaps one-third of its orbit, the foot traveling idly through the remainder of its path and in the meantime swinging far to the rear of its working position. In my devices the pedals are borne by peculiar vertically-swinging levers arranged to impart rotary movement to the driving-shaft, the pedals swinging in vertical planes and having the maximum leverage while being depressed by the foot.

In the drawings, Figure 1 is a side elevation of so much of a bicycle as is necessary to show my devices in their proper relation to the other parts of the machine. Fig. 2 is a plan view showing most of my novel construction. Fig. 3 shows detached a part seen also in Fig. 1, the view being from the right in that figure.

In the views, A represents the frame of the machine, B the wheels, C the crank or driving shaft, D E the sprocket-wheels, and F the chain, all in general form and relative arrangement similar to like parts in ordinary machines.

As is usual, the sprocket-wheel D is fixed to one end of the driving-shaft; but in this case it is provided with a crank-pin G at a short distance from the shaft and fixed either in the sprocket itself, part of which thus serves as a crank, or in a boss or crank H, integral with the wheel or rigidly fixed thereto. At the opposite end of the shaft is a second crank I, extending oppositely from the shaft and provided with a crank-pin G' at the same distance from the shaft as the pin H. In Fig. 1 the cranks are shown as vertical, while in Fig. 2 they are in a horizontal position. Upon each of these pins is pivoted a forwardly-extending foot-lever J, provided at its forward end with any suitable pedal. At some distance above the shaft and in the same vertical line are grooved wheels K, revolubly mounted in forks L, depending from arms M, rigidly supported from the seat-post tube P of the frame. In their grooves and between the downwardly-projecting branches of the forks fit the levers J, whose upwardly and rearwardly inclined upper edges N are V-shaped in cross-section, as shown in Fig. 3. The levers J are primarily duplicates, although to secure narrow tread they may be bent inwardly, as shown at O, Fig. 2, the fact that they do not swing, like the ordinary cranks, past the rear fork of the frame making it possible to bring them as near together as may be desired. Now, supposing the upper crank-pin to be at the proper distance in front of the driving-shaft, pressure upon the proper pedal swings the corresponding lever about its wheel K as a fulcrum and forces the crank-pin downward, the lever sliding forward meantime on the wheel K. The shaft is thus rotated until the other crank reaches a position corresponding to that occupied by the first when the pressure began to act, and this is depressed in the same manner, and so on indefinitely, the feet acting in succession, as in using cranks of the ordinary construction. As each pedal approaches the point where it is to receive pressure it is moved quickly forward, giving increase of lever-arm just when it is useful. From this point the arm gradually lengthens until the crank is horizontal, when it again shortens, first gradually, then rapidly, then again slowly, until the minimum is reached, when the crank extends horizontally rearward.

It is to be noticed that the swing of the pedals or the vertical distance through which the foot must move depends upon the position of the wheel K and the inclination of the lever edge N, it being a simple matter to make the path of the pedal as short as may be desired. In ladies' wheels, partly because the skirts both impede motion and lag in following it, knee movement, either horizontal or vertical, should be as small as possible, and hence this construction is especially advantageous in such wheels.

Although a chain-wheel has been shown for purposes of illustration, it is obvious that the novelty is independent of the means employed for transmitting the rotary motion of the driving-shaft. For this as well as for other reasons I do not wish to limit myself to the exact construction set forth.

What I claim is—

1. The combination with a bicycle-frame and a crank-shaft mounted therein, of a short crank fixed to said shaft, a fulcrum fixed to the frame approximately vertically above the crank-shaft, and a foot-lever pivoted upon the crank-pin, extending forward therefrom, and having an edge extending rearwardly upward in sliding contact with said fulcrum, substantially as set forth.

2. The combination with a frame and a crank-shaft mounted between its forks, of a short crank fixed to said shaft, a fulcrum-wheel revolubly supported by the frame approximately vertically over the shaft, a forwardly-extending foot-lever pivoted upon the crank-pin and having an edge which extends obliquely and rearwardly upward and makes sliding contact with said wheel.

3. The combination with the frame, of the crank-shaft mounted therein, the cranks fixed to said shaft, the forks fixed to the seat-post above said shaft, the wheels mounted in said forks, respectively, and the pedal-levers pivoted upon the crank-pins and having the oblique edges lying in said forks, respectively, in sliding contact with the corresponding wheels.

In testimony whereof I affix my signature in presence of two witnesses.

JAMES C. DEVLIN.

Witnesses:
WALLACE GREENE,
HUGH M. STERLING.